United States Patent [19]

Hofer

[11] 3,990,319
[45] Nov. 9, 1976

[54] ELECTRICAL CONTROL DEVICE FOR ELECTRIC MOTOR DRIVEN, ELECTRICALLY TURNABLE WHEELCHAIRS FOR INVALIDS AND OTHER PATIENTS

[75] Inventor: Björn Hofer, Jarfalla, Sweden
[73] Assignee: Landstingens Inkopscentral Lic., Solna, Sweden
[22] Filed: July 1, 1974
[21] Appl. No.: 484,565

[30] Foreign Application Priority Data
July 4, 1973 Sweden .............................. 7309427

[52] U.S. Cl. .......................................... 74/471 XY
[51] Int. Cl.² .......................................... G05G 9/00
[58] Field of Search ............ 74/523, 471 R, 471 XY, 74/473, 565; 180/77 H, 77 HT, 99, DIG. 3

[56] References Cited
UNITED STATES PATENTS

| | | | |
|---|---|---|---|
| 3,779,095 | 12/1973 | Audet | 74/471 XY X |
| 3,814,199 | 6/1974 | Jones | 180/77 H X |
| 3,831,633 | 8/1974 | Comer | 74/471 XY X |

FOREIGN PATENTS OR APPLICATIONS

| | | | |
|---|---|---|---|
| 1,198,905 | 7/1970 | United Kingdom | 180/DIG. 3 |

*Primary Examiner*—Samuel Scott
*Assistant Examiner*—Frank H. McKenzie, Jr.
*Attorney, Agent, or Firm*—Arthur B. Colvin

[57] ABSTRACT

An electrical control or operation device for wheelchairs for invalids is provided, the wheelchair being driven and steered electrically. The device comprises two control means, each preferably consisting of two potentiometers, one of the control means controlling the speed forward and backward of the wheelchair, and the other control means controlling the direction of motion of the wheelchair. The two control means may be potentiometers or similar means and can be adjusted individually by one single lever. The body or casing of one of the two control means is fixed to the frame of the control device, and that of the other control means is mechanically connected to the control shaft of the first control means, whereas the control shaft of the second control means is mechanically connected to the lever. At the neutral position of the lever corresponding to zero speed and straight course of the wheelchair, the axes of the lever and of the two said shafts are at substantially right angles each in a different coordinate direction. The device is mounted on the wheelchair such that when moving the lever forward or backward in the longitudinal direction of the chair, the chair will move forward or backward, respectively. Similarly, when moving the lever laterally, the chair will turn into the corresponding direction. The lever may be operated by only two fingers or even by only one finger of the hand, or by the cupped palm thereof.

9 Claims, 4 Drawing Figures

ELECTRICAL CONTROL DEVICE FOR ELECTRIC MOTOR DRIVEN, ELECTRICALLY TURNABLE WHEELCHAIRS FOR INVALIDS AND OTHER PATIENTS

The subject matter of the present invention is related to manual, electrical control of an electric motor-driven, electrically turnable wheelchair, which implies that the wheelchair is furnished with one or more electric motors, generally battery-driven, for both driving the wheelchair at the desired speed (driving speed) forward and backward and for changing the direction of motion, i.e. for turning. In the interest of avoiding confusion the word "control" will not be used for changes in the direction of motion, i.e. for "steering" or the designation "yawing" as applied to ships.

In wheelchairs of the above-mentioned type, turning is effected either by means of rotating an articulated wheel, i.e. a wheel which is rotatable about a vertical axis, by means of an electric motor or by temporarily driving the two wheelchair drive wheels at different speeds, even, when necessary, in opposite directions to allow turning the wheelchair in the smallest possible turning radius. Other systems are also known but are of minor interest here.

Extremely high demands are placed on the control device since it must be operable by persons having only one hand, who are debilitated, who are missing several fingers or have only one or some functioning fingers, have negligible or no gripping capacity, etc. The control device should be operable with only two fingers or alternatively with the palm of the hand. Preferably the same type of control device should be utilizable for all wheelchairs and all types of patients, i.e. it should be able to be employed universally without appreciably raising the price of wheelchairs which are used by persons having a fully functionable hand.

All of these aims and others are served by the invention according to the main claim, and it is a simple matter to execute or supplement the control device according to the invention for meeting other aims concerning direction indicator, "dead man's grip", connection of lights and horn, etc., possibly to the extent that the control device lever need not be released.

FIGS. 1 and 2 in the drawing show an example of a control device according to the invention in two normal planes, preferably approximately vertical planes.

Corresponding details in the two embodiments shown have the same reference numerals in all of the Figures.

Figure 1:
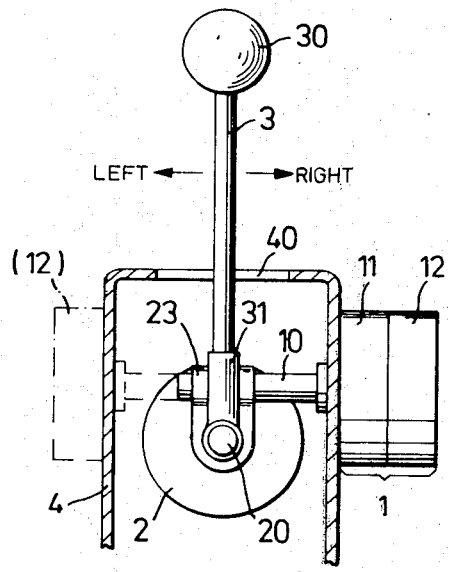
Figure 2:
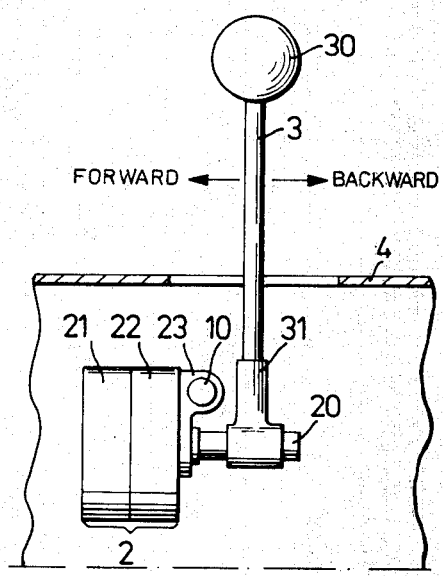

FIGS. 1 and 2 show a manually manoeuverable electrical control device having a first and a second control means 1 and 2 respectively. The control device has a shell 4, in the form of a casing adapted for mounting on one arm rest of the wheelchair, by way of example, and a manual control lever 3. Each of the control means 1 and 2 comprises preferably one potentiometer or two potentiometers 11,12 and 21,22, respectively, having a common shaft 10 and 20 respectively. A single potentiometer can suffice according to the particular circuit diagram for the electrical device for driving and changing the direction (turning) of the wheelchair. Even rheostats, controllers, angle sensors, or other known devices which emit an angle-dependent electrical signal are possible instead of potentiometers. Devices, the output of which is a function of a linear motion (for example in connection with mechanical conversion of rotational to linear motion) or as a function of pressure (for example by mechanical or fluid conversion of motion to pressure) are also possible.

The two potentiometers 11 and 12 in the first control means 1 are attached to the control device casing 4. The free end portion of the potentiometer shaft 10 is mounted in an eye or hub 23 on the movable second control means 2 which, in contrast to the fixed first control means, is rotatable together with the lever 3 in that the shaft 20 of the second control means 2 is rigidly connected to the lever 3 by means of a tee 31.

The two potentiometers 11, 12 in the control means 1 are shown in FIG. 1 on one and the same side of the control device casing 4. One potentiometer 12 can alternatively be arranged on the other side of the casing 4 coaxially in relation to the shaft 10 and the potentiometer 11. This latter alternative has been indicated in FIG. 1 by broken lines and by the designation 12 in parentheses.

FIGS. 1 and 2 show the two potentiometers 11, 12 in the fixed control means 1 adapted for regulation of desired speed, while the two potentiometers 21, 22 in the rotatable control means 2 are adapted for regulation of the direction of motion (but not for reversing the direction). The lever 3 is shown fitted with a ball 30, which can be held between the fingers or the palm of a cupped hand, so that the lever can be moved to the left and to the right as in FIG. 1, at which time the shaft 20 of the rotatable control means 2 is rotated in accordance herewith and rotates the wipers of the two potentiometers 21, 22. This causes the wheelchair electrical motor system to turn the wheelchair to the left or right, respectively. If, on the other hand, the lever 3 is moved normally to the previously described movement, namely to the left or to the right as in FIG. 2, this movement is transmitted from the lever the roatatable body of the second control means 2 without rotating its shaft 20 and by means of the projecting hub 23 of this control means to the shaft 10 of the first control means, so that said shaft is rotated to the left (counter-clockwise in FIG. 2) or to the right, respectively. If the lever 3 is moved to the left in FIG. 2 from a neutral position, which should simultaneously be a braking position, the forward speed of the wheelchair increases. If the lever is moved to the right from the neutral position, the wheelchair is driven backwards.

The lever is thus movable in two normal planes, corresponding to the plane of the paper in FIG. 1 and in FIG. 2, movement being permitted by an opening 40 in the casing 4 around the lever.

Figure 3:
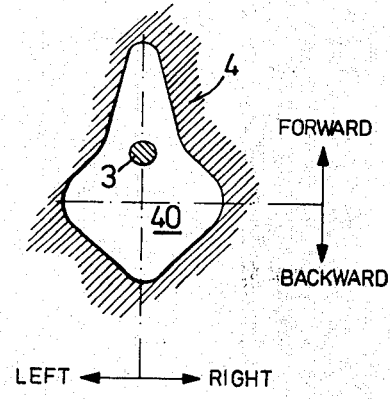
FIG. 3 shows a coulisse for the control device lever.

Fig. 3 shows an embodiment of a suitable contour for this opening 40, whose edge comprises a coulisse for mechanical delimitation of the movement of the lever 3. The neutral position of said lever corresponds to the intersection of the two broken lines in FIG. 3. If the lever is moved forward, namely upward in FIG. 3, so that the wheelchair speed increases, (from zero at the neutral position) the possibility for moving the lever sideways progressively diminishes, i.e. the possibility of turning the wheelchair at too sharp an angle decreases. The risk of tipping the wheelchair is hereby greatly reduced or eliminated should one attempt to navigate a sharp curve at higher speed, i.e. a curve whose radius of curvature is less than the minimum value for the speed in question. This limitation can additionally or alternatively be effected by electrical means. The wheelchair speed is, however, not merely dependent upon the speed selected with the lever, but also upon the terrain angle, the wheelchair load, the friction between the wheels and the ground, which in turn is dependent upon the condition of the surface, the effects of weather, etc. The coulisse 40 does provide good safety, however, in the majority of cases, and the only crucial factor, namely the inclination of the surface, can nearly or wholly be eliminated by means of an inclination sensor, for example a damped pendulum connected to a potentiometer shaft, so adapted that a limiting of the wheelchair turning radius and/or speed is effected if the wheelchair leans longitudinally or latitudinally. This limitation can possibly act in combination with curve-taking limitation effected by means of the coulisse and can be so embodied that it does not operate when moving forward or backward on upward slopes or when taking a curve in the right direction on an inclined surface. Through judicious selection of dimensions and other values, one can ensure that the effect of other factors such as road condition, wheelchair load, etc. cannot cause the wheelchair speed to increase beyond those values which are the basis of the shape of the coulisse 40. The coulisse can, however, advantageously be supplemented or replaced with an equivalent electrical circuit to effect the above limitation. The coulisse can additionally be utilized as an extremely dependable ultimate limitation in the event that the electrical limiting device is defective or inoperative.

The form of the coulisse 40 in FIG. 3 has been chosen somewhat arbitrarily since it must be calculated or determined on the basis of the mechanical and electrical values of the wheelchair.

Figure 4:
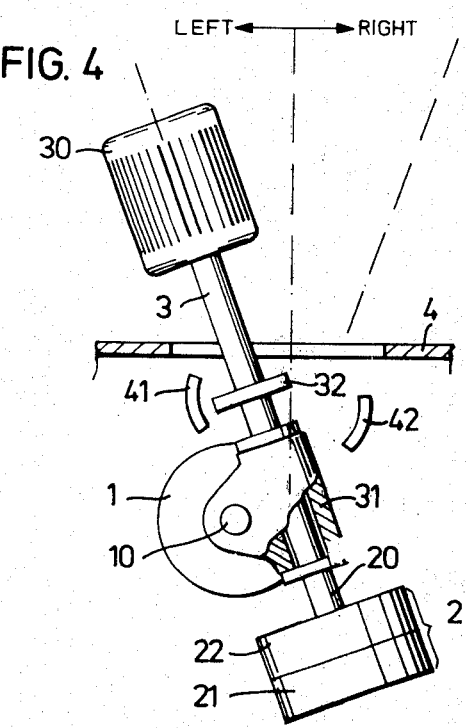
FIG. 4 shows another embodiment of a control device according to the invention.

FIG. 4 shows another embodiment of the control device according to the invention. The control means 1 is rigidly connected to the casing 4 and the control means 2 is rotatable. The shaft 10 of the control means 1 is normal to the lever 3 and is mounted in a bushing 31, in which the lever 3 is rotatable (in contrast to the embodiment in FIGS. 1–3). Here, the lever is movable in only one plane, namely the plane of the paper in FIG. 4 (corresponding to the plane of the paper in FIG. 2) and is thus not surrounded by a coulisse, but instead is movable in a slit in the shell 4. The shaft 20 of the movable control means is coaxial with the lever 3 and can be rigidly connected to or identical with said lever. The mechanically interconnected "ganged" potentiometers 21, 22 are non-rotatably and preferably rigidly connected to the bushing 31 by non-illustrated means, e.g. bars, so that they are prevented from rotating together with the shaft 20 and the lever 3.

The fixed control means 1 is shown to be adapted for control of the wheelchair turning radius during turning of the wheelchair and the rotatable control means 2 is shown to be adapted for controlling the wheelchair speed forward and backward. If the lever 3 is moved to the left or to the right as in FIG. 4, the wheelchair turns to the left or right, respectively. If the knob 30 of the lever 3 is rotated, the wheelchair speed is altered. Otherwise, what has been said in connection with FIGS. 1 and 2 applies.

The control device according to FIG. 4 can also be furnished with a mechanical device having the same functions as the coulisse according to FIG. 3. By way of example, the lever 3 can be fitted with a fixed cam disc or cam cylinder 32 whose contour is chosen according to the same principles as applied to the contour of the coulisse 40 and, in principle, can be said to be approximately the same (polar coordinate system in place of cartesian system). In addition, there are two stops 41, 42 rigidly connected to the casing 4 which are so designed as to delimit the movement of the cam disc 32 and thereby also the movement of the lever 3 increasingly as the lever and the cam disc 32 attached thereto are rotated for higher speed forward or backward. As in FIG. 3, no appreciable or no such limitation is effected at extremely low speeds or at rest. The additional electrical limiting possibilities mentioned in connection with FIGS. 1–3 can, of course, also be employed here.

In both of the abovedescribed embodiments according to FIGS. 1–4, the electrical connections for the rotatable control means 2 are flexible lines which can follow the movements of the control means without abrasion or breaking. Preferably, these flexible lines are carried at a certain angle which can, however, potentially be several times greater than 360° around the shaft 10 of the fixed control means 1, so that the movement of the flexible line is as small as possible. The shaft 10 can alternatively be hollow and the connection lines of the rotatable control means 2 can be twistable lines which extend through this shaft. Special flexible and twistable lines (stranded wires) are well known and on the market.

According to FIGS. 1–3, the shaft 10 of the fixed control means 1 is rotated by movement of the lever 3 in a first plane, namely the plane of the paper in FIG. 2, and the shaft 20 of the movable control means 2 is rotated by movement of the lever 3 in a second plane, namely the plane of the paper in FIG. 1, whereby the first control means 1 controls the speed and the second control means 2 controls the wheelchair direction laterally.

It is, of course, alternatively possible to use the first control means 1 for changing direction and the second control means 2 for controlling the speed. For obvious psychological reasons the control device and its coulisse, if any, should be placed at 90° lateral angular displacement to the wheelchair in relation to what has been shown so that the lever is moved forward and backward for speed changes and laterally for cornering.

The equivalent applies to FIG. 4 where movement of the lever in the first plane, i.e. the plane of the paper in FIG. 4, results in a change in the direction of motion laterally by means of the fixed control means 1, while rotating the lever influences the movable control means 2 results in a change of speed. Here as well, the two functions can be interchanged and the control device is thus placed with the aforementioned 90° angular displacement to the wheelchair so that the lever is moved forward and backward for change of speed and direction forward and backward, while rotating the lever in the same way (i.e. in the same direction) as one rotates an automobile steering wheel results in cornering. In that case, it is fitting to design the knob 30 in FIG. 4 in the form of a mushroom top or a small steering wheel having such diameter and shape that it can be rotated by a cupped palm or with the fingers of one hand, possibly even with a single finger.

The knob 30 for the control device according to FIGS. 1 and 2 can also be mushroom shaped or have another shape which is appropriate, possibly even an oblong dowel having approximately the same shape as a table knife handle.

The connections between the lever and the control means for transmitting mechanical movement shall be inelastic, i.e. non-resilient, in the direction of control. They can comprise flexible shafts, Bowden wire, double-wound (both left and righthand) helices, etc., but these types of flexible connections should preferably be avoided. The connections can, however, comprise gear wheels, articulated couplings or other inelastic kinematic mechanisms. The aforementioned connections can, however, of course be elastic or, for example axially displaceable (splines, telescopic connections etc.) in a direction where such elasticity or displacement does not influence the control of the control means. For example, the mechanical connection between the lever 3 and the control means shaft 20 by means of the tee 31 can be so adapted that the lever 3 and/or the shaft 20 are axially displaceable, possibly resiliently axially displaceable, but non-rotatable in relation to the tee 31, by for example making the lever and/or the shaft 20 four-sided or six-sided instead of cylindrical and designing the hole in the tee 31 with a similar shape. A lever which is longitudinally displaceable in relation to the tee 31, both in FIGS. 1–2 and in FIG. 4 can be desirable especially in the event that a "dead man's grip" which is to be actuated by the lever 3 is arranged in the tee 31.

As was implied in the preceding, the control device should preferably be furnished with a "dead man's grip" so that the wheelchair is immediately braked when the lever or a part of the lever is released. The braking force should, however, preferably be speed dependent in such a way that the wheelchair does not tip forward (or backward) when automatically braked. Electrical, mechanical, pneumatic and hydraulic speed-dependent braking is known and thus, need not be more closely described. The "dead man's grip" can be embodied as a recessed, slightly protruding springing key, e.g. a push button on the upper surface of the lever knob. This button actuates an electrical contact in such a way that all drive power is terminated and the brakes are applied when the button is released. The connection line for the button contact can extend through a bore in the lever and subsequently either laterally out through a side hole in the lever 3 inside the shell 4 or through a bore in the shaft 20 of the control means 2 and can subsequently be connected mechanically to the connection leads of this control means.

Alternatively, the "dead man's grip" can comprise the lever 3 which is longitudinally resilient and which must be pressed downward somewhat with the hand, and where a contact of the aforementioned type can be arranged, for example within the bushing 31 according to FIGS. 1, 2 or 4 and can be connected to a flexible line approximately as already described.

Key switches for direction indicator, lights, a horn or the like can be mechanically connected to the lever 3 so as to be accessible with the same hand with which the lever is moved, even so that the lever need not be released. In such an arrangement, however, a "dead man's grip" utilizing a longitudinally resilient lever would be appropriate.

The direction indicator can alternatively be switched-on automatically when the lever is moved (or possibly rotated) for changing direction. This presupposes, however, that the patient first changes direction mildly and slowly so that the direction indication can take place in time. The embodiment can alternatively be such that a movement (or rotation) of the lever automatically switches-on the direction indicator, but that turning the wheelchair does not begin before the lever is depressed longitudinally to engage an actuation switch for the actual direction change. In this case a possible "dead man's grip" can obviously not be dependent on the longitudinal movement of the lever, but can instead comprise for example a previously described push button on the upper end surface of the lever or the like.

Instead of a resilient lever or a special springing key above the lever knob, the knob can be made resilient in relation to the lever 3 in the longitudinal direction of the lever so as to actuate for example the "dead man's grip" or for effecting an order from the lever to change direction.

It should be evident from the above that the subject matter of the invention can be modified in multivarious ways and can be adapted to various demands and purposes.

What I claim is:

1. In an electric motor driven and steered wheelchair of the type in which motive power and steering are effected responsive to the selective energization of electric motor means connected to the wheels of said wheelchair, an improved control mechanism comprising a casing secured to said wheelchair, a first voltage varying means fixed to said casing and having a first control shaft rotatable about a first axis of rotation, an operator lever adapted to be grasped by the user mounted to said shaft and adapted to rotate said shaft responsive to movement of said lever in a first plane, a second voltage varying means movably mounted in said casing and having a second control shaft, said second control shaft being connected to said lever and rotatable about a second axis normal to said first axis responsive to movements of said lever in a direction normal to said first plane, one of said voltage varying means being connected to control the propulsion speed of said motor means and the other of said voltage varying means being connected to control the steering function of said motor means.

2. Apparatus in accordance with claim 1 wherein the shaft of said first voltage varying means is operatively connected to the body of said second voltage varying means, and said lever is operatively connected to the shaft of said second voltage varying means, whereby rotations of said shafts about said axes are effected responsive to movement of said lever in planes normal to said first and second axes.

3. Apparatus in accordance with claim 1 and including blocking means positioned to engage said lever for limiting the amount of movement from a neutral position which may be imparted to said voltage varying means controlling the steering function of said motor means progressively in accordance with the departure from a neutral position of said lever in a direction increasing the propulsion speed of said motor means.

4. Apparatus in accordance with claim 3 wherein said blocking means comprises a guide plate having an opening, and said lever projects through said opening, said opening being elongated in the direction in which said lever must be moved to achieve propulsion, the width of said opening being greatest at the neutral propulsion position of said lever and decreasing progressively at longitudinal positions increasingly displaced from said neutral position.

5. Apparatus in accordance with claim 3 wherein said lever is coaxial with the shaft of said second voltage varying means, and said second voltage varying means is connected to control said steering function, said blocking means being positioned progressively, increasingly to limit rotation of said lever in accordance with the departure of said lever from said neutral position.

6. Apparatus in accordance with claim 1 wherein the shafts of said first and second voltage varying means and said lever are each at right angles to the other.

7. Apparatus in accordance with claim 1 wherein said operating lever is rotatably supported on bearing means secured to the shaft of said first voltage varying means and directly connected to the shaft of said second voltage varying means, whereby movement of said shaft of said second voltage varying means about said second axis is effected responsive to rotation of said lever about its longitudinal axis, and rotation of said shaft of said first voltage varying means is effected by bodily movement of said lever in a plane normal to said first axis.

8. Apparatus in accordance with claim 1 wherein said first and second voltage varying means comprise potentiometers.

9. In an electric motor driven wheelchair of the type in which motive power and steering are effected responsive to the selective energization of electric motor means operatively connected to the wheels of said wheelchair, improved control means comprising a first control means having a body and an angularly movable control shaft, said body being fixed to the frame of said chair, a second control means having an angularly movable control shaft and a body, the body of said second control means being fixed to the shaft of said first control means, lever means fixed to said shaft of said second control means whereby said lever means operates one said control means when moved in a first direction and the other said control means when moved in a direction normal to said first direction to control the propulsion and steering of said wheelchair.

* * * * *